(12) United States Patent
Wang et al.

(10) Patent No.: US 8,755,580 B2
(45) Date of Patent: Jun. 17, 2014

(54) FLOURESCENT DOT COUNTING IN DIGITAL PATHOLOGY IMAGES

(75) Inventors: Su Wang, San Jose, CA (US); Xun Xu, Palo Alto, CA (US); Akira Nakamura, San Jose, CA (US)

(73) Assignee: Sony Corporation, Tokyo (JP)

( * ) Notice: Subject to any disclaimer, the term of this patent is extended or adjusted under 35 U.S.C. 154(b) by 220 days.

(21) Appl. No.: 13/423,208

(22) Filed: Mar. 17, 2012

(65) Prior Publication Data

US 2013/0243277 A1    Sep. 19, 2013

(51) Int. Cl.
   *G06K 9/00* (2006.01)
(52) U.S. Cl.
   USPC .......................................... 382/129; 128/922
(58) Field of Classification Search
   USPC ......... 382/100, 128, 129, 130, 131, 132, 133; 128/922; 378/4–27, 42, 44, 190
   See application file for complete search history.

(56) References Cited

U.S. PATENT DOCUMENTS

| | | | | |
|---|---|---|---|---|
| 6,055,325 A * | 4/2000 | Garini et al. | .................. | 382/129 |
| 6,548,259 B2 * | 4/2003 | Ward et al. | .................... | 435/6.11 |
| 6,674,885 B2 * | 1/2004 | Hansen et al. | ................. | 382/133 |
| 6,800,249 B2 * | 10/2004 | de la Torre-Bueno | .......... | 422/63 |
| 7,272,252 B2 * | 9/2007 | De La Torre-Bueno et al. | ............................ | 382/133 |
| 7,660,454 B2 * | 2/2010 | Kilpatrick et al. | ............ | 382/133 |
| 8,019,134 B2 * | 9/2011 | Athelogou et al. | ........... | 382/128 |
| 8,310,531 B2 * | 11/2012 | Nandy | ............................. | 348/79 |
| 8,391,575 B2 * | 3/2013 | Athelogou et al. | ........... | 382/128 |
| 8,542,899 B2 * | 9/2013 | Athelogou et al. | ........... | 382/128 |
| 2005/0265588 A1 * | 12/2005 | Gholap et al. | ................. | 382/128 |
| 2008/0037872 A1 | 2/2008 | Lee et al. | | |
| 2010/0290692 A1 | 11/2010 | Macaulay et al. | | |
| 2011/0317904 A1 | 12/2011 | Zhu et al. | | |

FOREIGN PATENT DOCUMENTS

WO    0120044 A2    3/2001

OTHER PUBLICATIONS

Ram et al., "Segmentation and Detection of Fluoresent 3D Spots", International Society for Advancement of Cytometry, published on line Feb. 18, 2012 in Wiley Online Library., <URL:http://onlinelibrary.wiley.com/doi/10.1002/cyto.a.22017/pdf>, Cytometry Part A. 81A: 198-212, 2012.

Netten et al., "FISH and Chips: Automation of Fluorescent Dot Counting in Interphase Cell Nuclei"., Wiley-Liss In, 1997.Faculty of Applied Physics, Delft University of Technology, NL-2628 CJ Delft, The Netherlands, Cytometry 28:1-10 (1997).

Wills et al., "A Feature-based Approach for Dense Segmentation and Estimation of Large Disparity Motion", International Journal of Computer Vision, Jun. 2006, vol. 68, Issue 2, pp. 125-143.

Hans Netten, et al., "FISH and Chips: Automation of Fluorescent Dot Counting in Interphase Cell Nuclei", 1997, Cytometry 28:1-10, Wiley-Liss, Inc., Faculty of Applied Physics, Delft University of Technology, NL-2628 CJ Delft, The Netherlands, Laboratory of Cytochemistry and Cytomerty, University of Leiden, NL-233 Al Leiden, The Netherlands.

* cited by examiner

*Primary Examiner* — Anand Bhatnagar
(74) *Attorney, Agent, or Firm* — Haverstock & Owens LLP

(57) ABSTRACT

Fluorescence in situ hybridization (FISH) enables the detection of specific DNA sequences in cell chromosomes by the use of selective staining. Due to the high sensitivity, FISH allows the use of multiple colors to detect multiple targets simultaneously. The target signals are represented as colored dots, and enumeration of these signals is called dot counting. Using a two-stage segmentation framework guarantees locating all potential dots including overlapped dots.

24 Claims, 4 Drawing Sheets

FLOURESCENT DOT COUNTING IN DIGITAL PATHOLOGY IMAGES

FIELD OF THE INVENTION

The present invention relates to the field of image processing. More specifically, the present invention relates to image processing in digital pathology images.

BACKGROUND OF THE INVENTION

Fluorescence in situ hybridization (FISH) is a cytogenetic technique developed by biomedical researchers in the early 1980s that is used to detect and localize the presence or absence of specific DNA sequences on chromosomes. FISH uses fluorescent probes that bind to only those parts of the chromosome with which they show a high degree of sequence complementarity. Fluorescence microscopy can be used to find out where the fluorescent probe bound to the chromosomes. FISH is often used for finding specific features in DNA for use in genetic counseling, medicine, and species identification. FISH can also be used to detect and localize specific mRNAs within tissue samples. In this context, it can help define the spatial-temporal patterns of gene expression within cells and tissues.

When observing a three-dimensional entity through a two-dimensional projection, one dot is able to hide behind another dot. Microscope imaging projects the three-dimensional entities onto a two-dimensional sensor. When the distance between two dots is too small, separating these two overlapped dots is challenging.

The intensities of FISH dots are local maxima; therefore, image hard thresholding is believed to generate artifacts with similar intensity range. In addition, dots tend to have blurred image boundaries with relatively lower image contrast.

SUMMARY OF THE INVENTION

Fluorescence in situ hybridization (FISH) enables the detection of specific DNA sequences in cell chromosomes by the use of selective staining. Due to the high sensitivity, FISH allows the use of multiple colors to detect multiple targets simultaneously. The target signals are represented as colored dots, and enumeration of these signals is called dot counting. Using a two-stage segmentation framework guarantees locating all potential dots including overlapped dots.

In one aspect, a method of fluorescent dot counting in an image programmed in a memory of a device comprises determining dot candidate seeds, segmenting dot candidate patches, extracting dot candidate features and classifying dot candidates. Determining the dot candidate seeds comprises applying a tophat transform to the image, applying h-maxima suppression, detecting regional maxima and performing connected component analysis. Segmenting the dot candidate patches comprises determining local and mean variance, implementing adaptive dilation, applying a distance transform, defining an initial foreground and background and executing graph cuts. Implementing adaptive dilation is with intensity values between [mean−variance, mean+variance]. The dot candidate features comprise shape and intensity-based features. Classifying the dot candidates includes a training stage and a testing stage. The training stage includes manually-labeled fluorescence in situ hybridization images are utilized as ground truth for a classifier. The testing stage includes individually scoring each candidate by classifiers as true positives and false positives. The device comprises a microscope. The device comprises a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a tablet computer, a portable music device, a video player, a DVD writer/player, a high definition video writer/player, a television and a home entertainment system.

In another aspect, a method of fluorescent dot counting in an image programmed in a memory of a device comprises determining dot candidate seeds, applying a tophat transform to the image, applying h-maxima suppression, detecting regional maxima and performing connected component analysis, segmenting dot candidate patches, determining local and mean variance, implementing adaptive dilation, applying a distance transform, defining an initial foreground and background and executing graph cuts, extracting dot candidate features and classifying dot candidates. Implementing adaptive dilation is with intensity values between [mean−variance, mean+variance]. The dot candidate features comprise shape and intensity-based features. Classifying the dot candidates includes a training stage and a testing stage. The training stage includes manually-labeled fluorescence in situ hybridization images are utilized as ground truth for a classifier. The testing stage includes individually scoring each candidate by classifiers as true positives and false positives. The device comprises a microscope. The device comprises a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a tablet computer, a portable music device, a video player, a DVD writer/player, a high definition video writer/player, a television and a home entertainment system.

In yet another aspect, a device for fluorescent dot counting comprises a memory for storing an application, the application for determining dot candidate seeds, segmenting dot candidate patches, extracting dot candidate features and classifying dot candidates and a processing component coupled to the memory, the processing component configured for processing the application. Determining the dot candidate seeds comprises applying a tophat transform to the image, applying h-maxima suppression, detecting regional maxima and performing connected component analysis. Segmenting the dot candidate patches comprises determining local and mean variance, implementing adaptive dilation, applying a distance transform, defining an initial foreground and background and executing graph cuts. Implementing adaptive dilation is with intensity values between [mean−variance, mean+variance]. The dot candidate features comprise shape and intensity-based features. Classifying the dot candidates includes a training stage and a testing stage. The training stage includes manually-labeled fluorescence in situ hybridization images are utilized as ground truth for a classifier. The testing stage includes individually scoring each candidate by classifiers as true positives and false positives.

DETAILED DESCRIPTION OF THE PREFERRED EMBODIMENT

A novel dot counting algorithm for fluorescence in situ hybridization (FISH) enables detection of overlapped dots in an image.

Figure 1:
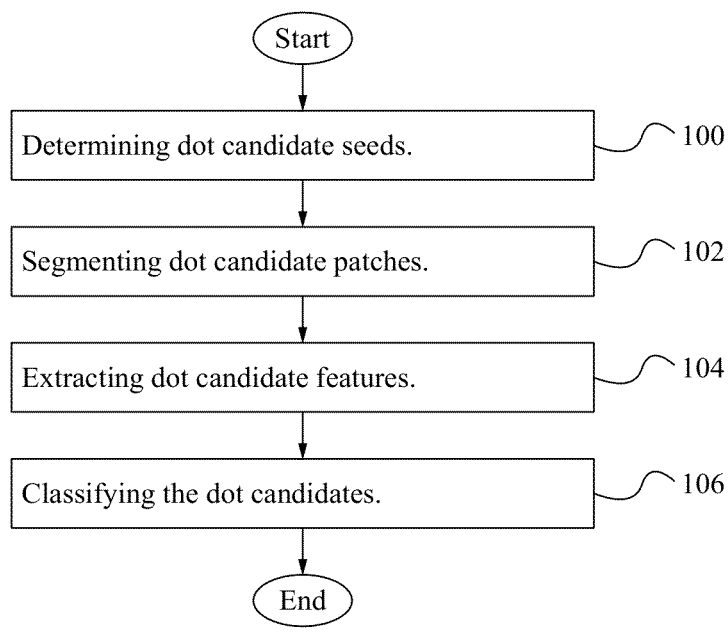
FIG. 1 illustrates a flowchart of a method of implementing FISH according to some embodiments.

FIG. 1 illustrates a flowchart of a method of implementing FISH according to some embodiments. In the step 100, dot candidate seeds are determined. Determining the dot candidate seeds includes applying a tophat transform to the image to extract small elements from the image; suppressing maxima; detecting regional maxima and connected component analysis is performed. In the step 102, dot candidate patches are segmented. Segmenting dot candidate patches includes determining a local mean (m) and variance (v); implementing adaptive dilation with intensity values between [m−v, m+v]; applying a distance transform; defining an initial foreground and background and executing graph cuts. In the step 104, dot candidate features are extracted. The features of dot candidates are extracted as shown below in Table 1. In the step 106, dot candidates are classified. In the training stage, manually-labeled FISH images are utilized as ground truth for any classifier such as a support vector machine. In the testing stage, each segment is individually scored by classifiers into true positives and false positives accordingly. A two-stage segmentation framework, dot candidate seed determination and patch segmentation, is implemented, which finds local intensity peaks. By finding local intensity peaks, overlapped dots are able to be detected.

Figure 2:
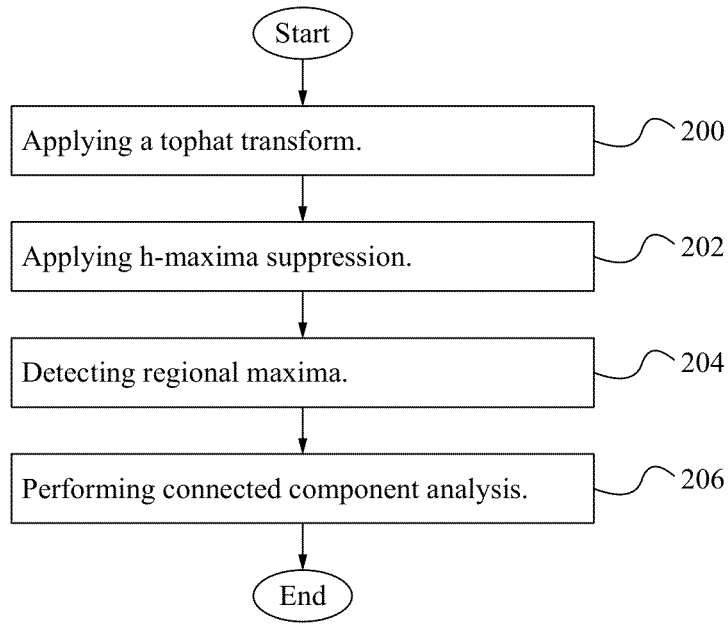
FIG. 2 illustrates a flowchart of a method of dot candidate seed determination according to some embodiments.

FIG. 2 illustrates a flowchart of a method of dot candidate seed determination according to some embodiments. In the step 200, a tophat transform is applied to extract small elements from the image. In the step 202, h-maxima suppression is applied to suppress all maxima in an intensity image whose height is less than h. In the step 204, regional maxima are detected. In the step 206, connected component analysis is performed which detects connected regions.

Figure 3:
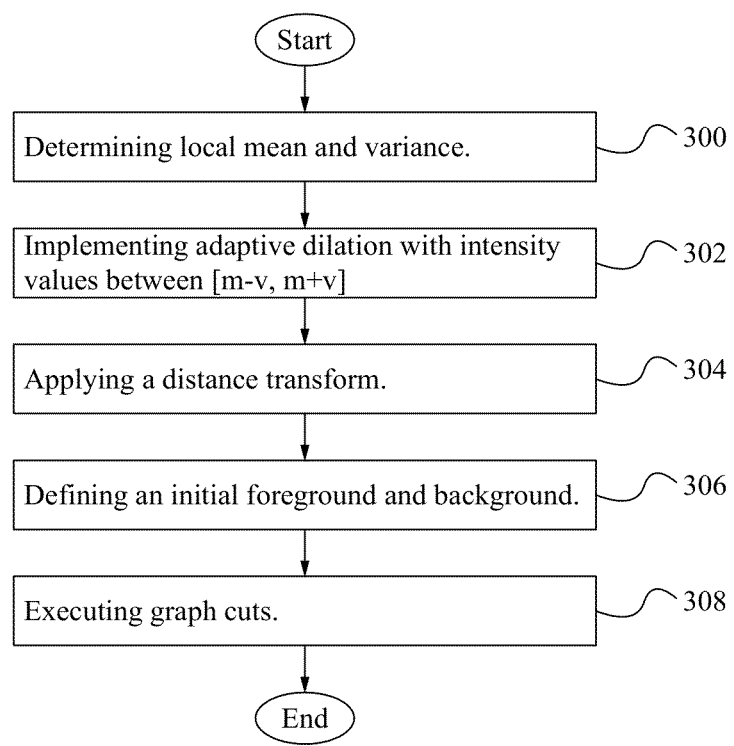
FIG. 3 illustrates a flowchart of a method of dot candidate patch segmentation according to some embodiments.

FIG. 3 illustrates a flowchart of a method of dot candidate patch segmentation according to some embodiments. In the step 300, local mean (m) and variance (v) are determined. In the step 302, adaptive dilation with intensity values between [m−v, m+v] is implemented. In the step 304, a distance transform is applied. In the step 306, an initial foreground and background is defined based on the distance transform information. In the step 308, graph cuts are executed.

Table 1 shows dot candidate feature extraction. For each dot candidate (segment), a group of features is extracted including shape and intensity-based features.

TABLE 1

| Dot Candidate Feature Extraction | | |
|---|---|---|
| Feature | | Description |
| 1 | Shape | area |
| 2 | | eccentricity |
| 3 | | Equivalent diameter |
| 4 | | Major axis length |
| 5 | | Minor axis length |
| 6 | | Convex area |
| 7 | | extent |

TABLE 1-continued

| Dot Candidate Feature Extraction | | |
|---|---|---|
| Feature | | Description |
| 8 | Intensity-based | Standard deviation |
| 9 | | entropy |
| 10 | | Maximum intensity value (R, G, B channel) |
| 11 | | Minimum intensity value (R, G, B channel) |
| 12 | | Mean intensity value (R, G, B channel) |

Figure 4:
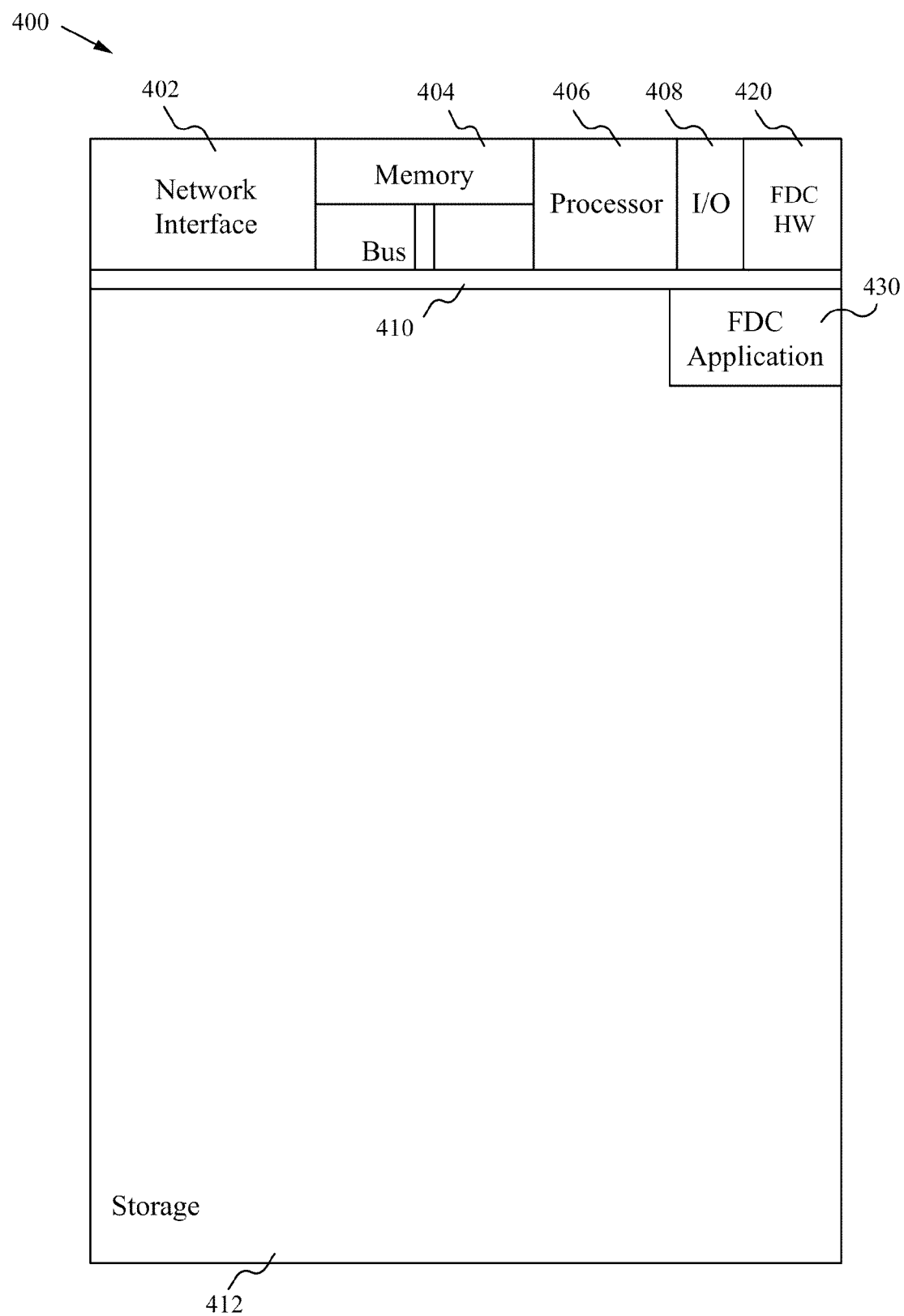
FIG. 4 illustrates a block diagram of an exemplary computing device configured to implement the fluorescent dot counting according to some embodiments.

FIG. 4 illustrates a block diagram of an exemplary computing device 400 configured to implement the fluorescent dot counting according to some embodiments. The computing device 400 is able to be used to acquire, store, compute, process, communicate and/or display information such as images. For example, a computing device 400 is able to be used to acquire and store an image. The fluorescent dot counting is typically used during or after acquiring images. In general, a hardware structure suitable for implementing the computing device 400 includes a network interface 402, a memory 404, a processor 406, I/O device(s) 408, a bus 410 and a storage device 412. The choice of processor is not critical as long as a suitable processor with sufficient speed is chosen. The memory 404 is able to be any conventional computer memory known in the art. The storage device 412 is able to include a hard drive, CDROM, CDRW, DVD, DVDRW, Blu-Ray®, flash memory card or any other storage device. The computing device 400 is able to include one or more network interfaces 402. An example of a network interface includes a network card connected to an Ethernet or other type of LAN. The I/O device(s) 408 are able to include one or more of the following: keyboard, mouse, monitor, display, printer, modem, touchscreen, button interface and other devices. In some embodiments, the hardware structure includes multiple processors and other hardware to perform parallel processing. Fluorescent dot counting application(s) 430 used to perform fluorescent dot counting are likely to be stored in the storage device 412 and memory 404 and processed as applications are typically processed. More or fewer components shown in FIG. 4 are able to be included in the computing device 400. In some embodiments, fluorescent dot counting hardware 420 is included. Although the computing device 400 in FIG. 4 includes applications 430 and hardware 420 for implementing fluorescent dot counting, the fluorescent dot counting is able to be implemented on a computing device in hardware, firmware, software or any combination thereof. For example, in some embodiments, the fluorescent dot counting applications 430 are programmed in a memory and executed using a processor. In another example, in some embodiments, the fluorescent dot counting hardware 420 is programmed hardware logic including gates specifically designed to implement the method.

In some embodiments, the fluorescent dot counting application(s) 430 include several applications and/or modules. In some embodiments, modules include one or more sub-modules as well.

Examples of suitable computing devices include a microscope, a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television, a home entertainment system or any other suitable computing device.

Figure 5:
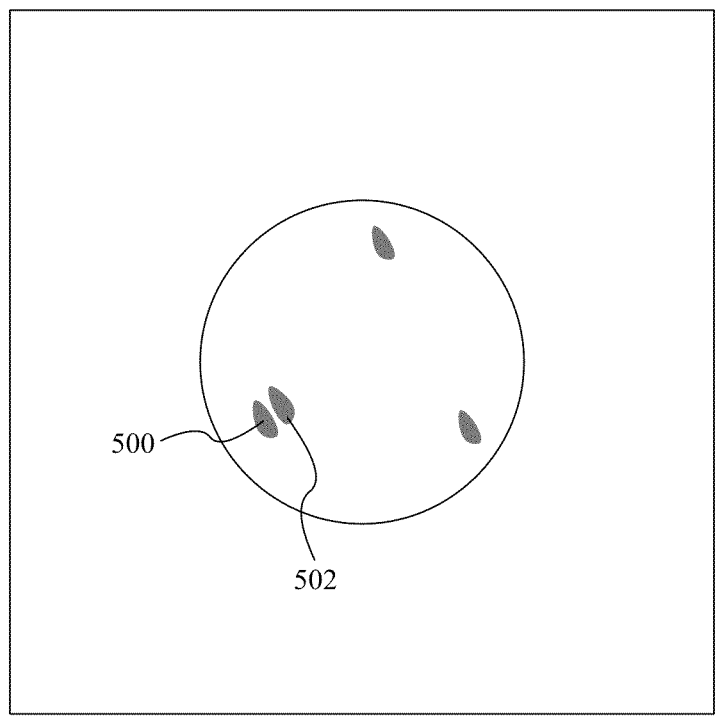
FIG. 5 illustrates an exemplary slide for fluorescent dot counting according to some embodiments.

FIG. 5 illustrates an exemplary slide for fluorescent dot counting according to some embodiments. As shown, there are several fluorescent dots within the slide. In particular, dot 500 and dot 502 are located very close to each other. In previous implementations, dots 500 and 502 would likely be counted as a single dot. Using the implementation described herein, dot 500 and dot 502 will be counted separately.

To utilize the fluorescent dot counting, a device such as a computer is able to be used to analyze an image. The fluorescent dot counting is automatically used for performing image/video processing, specifically to locate and count fluorescent dots. The fluorescent dot counting is able to be implemented automatically without user involvement.

In operation, the two-stage segmentation framework guarantees locating all potential dots including overlapped dots. This two-stage framework includes dot candidate seed determination and dot patch segmentation. Candidate seeds are those local intensity peaks which are the central part of dots, while dot patch segmentation is starting from these seeds, conditionally dilating from these seeds followed by graph cuts.

Some Embodiments of a Fluorescent Dot Counting in Digital Pathology Images

1. A method of fluorescent dot counting in an image programmed in a memory of a device comprising:
   a. determining dot candidate seeds;
   b. segmenting dot candidate patches;
   c. extracting dot candidate features; and
   d. classifying dot candidates.
2. The method of clause 1 wherein determining the dot candidate seeds comprises:
   a. applying a tophat transform to the image;
   b. applying h-maxima suppression;
   c. detecting regional maxima; and
   d. performing connected component analysis.
3. The method of clause 1 wherein segmenting the dot candidate patches comprises:
   a. determining local and mean variance;
   b. implementing adaptive dilation;
   c. applying a distance transform;
   d. defining an initial foreground and background; and
   e. executing graph cuts.
4. The method of clause 3 wherein implementing adaptive dilation is with intensity values between [mean−variance, mean+variance].
5. The method of clause 1 wherein the dot candidate features comprise shape and intensity-based features.
6. The method of clause 1 wherein classifying the dot candidates includes a training stage and a testing stage.
7. The method of clause 6 wherein the training stage includes manually-labeled fluorescence in situ hybridization images are utilized as ground truth for a classifier.
8. The method of clause 6 wherein the testing stage includes individually scoring each candidate by classifiers as true positives and false positives.
9. The method of clause 1 wherein the device comprises a microscope.
10. The method of clause 1 wherein the device comprises a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a tablet computer, a portable music device, a video player, a DVD writer/player, a high definition video writer/player, a television and a home entertainment system.
11. A method of fluorescent dot counting in an image programmed in a memory of a device comprising:
    a. determining dot candidate seeds;
       i. applying a tophat transform to the image;
       ii. applying h-maxima suppression;
       iii. detecting regional maxima; and
       iv. performing connected component analysis;
    b. segmenting dot candidate patches;
       i. determining local and mean variance;
       ii. implementing adaptive dilation;
       iii. applying a distance transform;
       iv. defining an initial foreground and background; and
       v. executing graph cuts;
    c. extracting dot candidate features; and
    d. classifying dot candidates.
12. The method of clause 11 wherein implementing adaptive dilation is with intensity values between [mean−variance, mean+variance].
13. The method of clause 11 wherein the dot candidate features comprise shape and intensity-based features.
14. The method of clause 11 wherein classifying the dot candidates includes a training stage and a testing stage.
15. The method of clause 14 wherein the training stage includes manually-labeled fluorescence in situ hybridization images are utilized as ground truth for a classifier.
16. The method of clause 14 wherein the testing stage includes individually scoring each candidate by classifiers as true positives and false positives.
17. The method of clause 11 wherein the device comprises a microscope.
18. The method of clause 11 wherein the device comprises a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a tablet computer, a portable music device, a video player, a DVD writer/player, a high definition video writer/player, a television and a home entertainment system.
19. A device for fluorescent dot counting comprising:
    a. a memory for storing an application, the application for:
       i. determining dot candidate seeds;
       ii. segmenting dot candidate patches;
       iii. extracting dot candidate features; and
       iv. classifying dot candidates; and
    b. a processing component coupled to the memory, the processing component configured for processing the application.
20. The device of clause 19 wherein determining the dot candidate seeds comprises:
    a. applying a tophat transform to the image;
    b. applying h-maxima suppression;
    c. detecting regional maxima; and
    d. performing connected component analysis.
21. The device of clause 19 wherein segmenting the dot candidate patches comprises:
    a. determining local and mean variance;
    b. implementing adaptive dilation;
    c. applying a distance transform;
    d. defining an initial foreground and background; and
    e. executing graph cuts.
22. The device of clause 21 wherein implementing adaptive dilation is with intensity values between [mean−variance, mean+variance].

23. The device of clause 19 wherein the dot candidate features comprise shape and intensity-based features.
24. The device of clause 19 wherein classifying the dot candidates includes a training stage and a testing stage.
25. The device of clause 24 wherein the training stage includes manually-labeled fluorescence in situ hybridization images are utilized as ground truth for a classifier.
26. The device of clause 24 wherein the testing stage includes individually scoring each candidate by classifiers as true positives and false positives.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method of fluorescent dot counting in an image programmed in a memory of a device comprising:
   a. determining dot candidate seeds, wherein determining the dot candidate seeds comprises:
      i. applying a tophat transform to the image;
      ii. applying h-maxima suppression;
      iii. detecting regional maxima; and
      iv. performing connected component analysis;
   b. segmenting dot candidate patches;
   c. extracting dot candidate features; and
   d. classifying dot candidates.
2. The method of claim 1 wherein segmenting the dot candidate patches comprises:
   determining local and mean variance;
   implementing adaptive dilation;
   applying a distance transform;
   defining an initial foreground and background; and
   executing graph cuts.
3. The method of claim 2 wherein implementing adaptive dilation is with intensity values between [mean−variance, mean+variance].
4. The method of claim 1 wherein the dot candidate features comprise shape and intensity-based features.
5. The method of claim 1 wherein classifying the dot candidates includes a training stage and a testing stage.
6. The method of claim 5 wherein the training stage includes manually-labeled fluorescence in situ hybridization images are utilized as ground truth for a classifier.
7. The method of claim 5 wherein the testing stage includes individually scoring each candidate by classifiers as true positives and false positives.
8. The method of claim 1 wherein the device comprises a microscope.
9. The method of claim 1 wherein the device comprises at least one of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a tablet computer, a portable music device, a video player, a DVD writer/player, a high definition video writer/player, a television and a home entertainment system.
10. A method of fluorescent dot counting in an image programmed in a memory of a device comprising:
   a. determining dot candidate seeds;
      i. applying a tophat transform to the image;
      ii. applying h-maxima suppression;
      iii. detecting regional maxima; and
      iv. performing connected component analysis;
   b. segmenting dot candidate patches;
      i. determining local and mean variance;
      ii. implementing adaptive dilation;
      iii. applying a distance transform;
      iv. defining an initial foreground and background; and
      v. executing graph cuts;
   c. extracting dot candidate features; and
   d. classifying dot candidates.
11. The method of claim 10 wherein implementing adaptive dilation is with intensity values between [mean−variance, mean+variance].
12. The method of claim 10 wherein the dot candidate features comprise shape and intensity-based features.
13. The method of claim 10 wherein classifying the dot candidates includes a training stage and a testing stage.
14. The method of claim 13 wherein the training stage includes manually-labeled fluorescence in situ hybridization images are utilized as ground truth for a classifier.
15. The method of claim 13 wherein the testing stage includes individually scoring each candidate by classifiers as true positives and false positives.
16. The method of claim 10 wherein the device comprises a microscope.
17. The method of claim 10 wherein the device comprises a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a tablet computer, a portable music device, a video player, a DVD writer/player, a high definition video writer/player, a television and a home entertainment system.
18. A device for fluorescent dot counting comprising:
   a. a memory for storing an application, the application for:
      i. determining dot candidate seeds, wherein determining the dot candidate seeds comprises:
         (1) applying a tophat transform to the image;
         (2) applying h-maxima suppression;
         (3) detecting regional maxima; and
         (4) performing connected component analysis;
      ii. segmenting dot candidate patches;
      iii. extracting dot candidate features; and
      iv. classifying dot candidates; and
   b. a processing component coupled to the memory, the processing component configured for processing the application.
19. The device of claim 18 wherein segmenting the dot candidate patches comprises:
   determining local and mean variance;
   implementing adaptive dilation;
   applying a distance transform;
   defining an initial foreground and background; and
   executing graph cuts.
20. The device of claim 19 wherein implementing adaptive dilation is with intensity values between [mean−variance, mean+variance].
21. The device of claim 18 wherein the dot candidate features comprise shape and intensity-based features.
22. The device of claim 18 wherein classifying the dot candidates includes a training stage and a testing stage.
23. The device of claim 22 wherein the training stage includes manually-labeled fluorescence in situ hybridization images are utilized as ground truth for a classifier.
24. The device of claim 22 wherein the testing stage includes individually scoring each candidate by classifiers as true positives and false positives.

* * * * *